United States Patent Office 3,383,359
Patented May 14, 1968

3,383,359
OLEFINICALLY UNSATURATED CYANIC ACID
ARYL ESTERS AND POLYMERS THEREOF
Hans Weitzel, Leverkusen, and Karl Dinges and Ernst
Grigat, Cologne-Stammheim, and Rolf Pütter, Dussel-
dorf, Germany, assignors to Farbenfabriken Bayer
Aktiengesellschaft, Leverkusen, Germany, a corpora-
tion of Germany
No Drawing. Filed Sept. 9, 1965, Ser. No. 486,297
Claims priority, application Germany, Oct. 9, 1964,
F 44,181
10 Claims. (Cl. 260—47)

ABSTRACT OF THE DISCLOSURE

Homopolymers and copolymers of olefinically un-
saturated cyanic acid aryl esters. Preferred comonomers
including esters of $\alpha,\beta$-unsaturated monocarboxylic acids,
$\alpha,\beta$-unsaturated carboxylic acids, amides thereof, nitriles
thereof, aliphatic vinyl compounds, conjugated diolefins
containing 4–6 carbon atoms and aromatic vinyl com-
pounds. Said polymers are cross-linkable at elevated tem-
peratures and/or under the influence of alkaline agents.

---

This invention relates to a process for the preparation
of cross-linked polymers in which monoolefinically un-
saturated compounds containing cyanic acid ester groups
are converted, optionally in combination with other
olefinically unsaturated compounds, into homopolymers
or copolymers, which are cross-linked in a subsequent
stage at elevated temperature and/or by alkaline agents.
It is known that various polymers can be prepared by
emulsion, dispersion, solution or mass polymerization,
and that they can be used in the form of dispersions,
latices or solutions, as binders for pigments and fibres,
for impregnating and producing all kinds of films and
coatings. It is possible by incorporating reactive groups
to cross-link a polymer, with the result that the resistance
of the end products to solvents, as well as their strength
and elasticity are increased. Reactive groups in the
broadest sense may be, for example, carbon-carbon double
bonds of the type present in diene polymers, which facil-
itates cross-linking by a vulcanisation process. Incor-
porated carboxyl, amido, hydroxyl or epoxy groups enable
cross-linking to be completed by the addition of metal
oxides, diamines, formaldehyde or polybasic carboxylic
acids.

Polymers containing carbonamide-methylol groups or
protected methylol groups, such as methylol ether and
methylol ester groups, are particularly important. These
"spontaneously cross-linking" groups enable the polymer
to be cross-linked, after it has been applied to a substrate
or otherwise shaped, without the addition of a second
component, resulting in the formation of methylol-bis-
carbonamide bridges. Unfortunately, polymers contain-
ing free or protected carbonamide-methylol groups have
the disadvantage that, even at fairly high temperatures,
they can only be adequately cross-linked at pH values
of below about 5 with the result that acids or acid-yield-
ing compounds have to be added. The action of an acid
on the substrate is, however, often undesirable because
it can lead, for example, to fibre damage or can influence
dyes.

It has now been found that mono-olefinically unsatu-
rated polymerisable compounds containing cyanic acid
ester groups can be converted into homopolymers, and,
in combination with other polymerisable compounds, into
copolymers which, after they have been processed to
form, for example, films, coatings and coverings, can
be cross-linked at elevated temperature and/or by the
action of alkaline-reacting agents, preferably alkalis or
alkaline-reacting salts.

The mono-olefinically unsaturated polymerisable com-
pounds containing cyanic acid ester groups as used ac-
cording to the invention are cyanic acid aryl esters which
carry an olefinically unsaturated, polymerisable group on
the aryl radical. The aryl radical, preferably phenyl or
naphthyl, can be substituted by other radicals such as
alkyl $(C_1-C_4)$, aryl radicals such as phenyl or naphthyl,
by halogen such as Cl or Br, by alkyl $(C_1-C_4)$-substituted
aryl radicals such as phenyl or naphthyl, by aralkyl
radicals such as benzyl, by nitro groups, sulphonic acid
radicals or by heterocyclic radicals such as pyrazolyl,
pyridyl or benzthiazolyl. The olefinically unsaturated
group

(wherein $R=H$, $CH_3$ or Cl) may be linked with the aryl
nucleus either directly or by a carboxylic acid, carboxylic
acid amide, thiolcarboxylic acid, thiocarboxylic acid, di-
thiocarboxylic acid or by a thioamidecarboxylic acid
group.

Compounds corresponding to the formula:

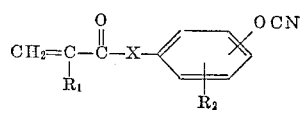

wherein $R_1$ represents H—, $CH_3$— or Cl; $R_2$ represents
H, alkyl $(C_1-C_4)$ or Cl; and X represents O or NH are
preferably used.

The cyanic acid esters required for the process accord-
ing to the invention are prepared in accordance with
earlier proposals (Belgian Pat. No. 643,627 of Feb. 28,
1964) from corresponding phenols by reaction with
cyanohalide in a liquid medium, preferably below 65°
C., in the presence of at least equivalent quantities of a
base.

It was surprising that the polymerizable cyanic acid
esters whose cyanic acid ester group is highly reactive,
could be used to prepare cross-linkable polymers, since
the cyanic acid ester groups had been expected to react
with one another or with other reactive groups during
polymerization, with the result that it would have been
impossible to cross-link the polymers on or with the sub-
strate. It was particularly surprising that polymers con-
taining free cyanic acid ester groups could actually be
prepared in aqueous emulsion.

The preparation of homopolymers of the monoolefini-
cally unsaturated compounds containing cyanic acid ester
groups is preferably carried out in dilute solution, as solu-
tion or precipitation polymerization, in which case any
solvents which do not react with the cyanic acid esters,
such as benzene, toluene or chloroform, may be used as
the solvents. Polymerization is then carried out in known
manner at temperatures in the range from 20° C. to 150°
C., preferably from 40 to 90° C., after the addition of
radical formers, for example, organic peroxide com-
pounds, peroxycarbonates or azo compounds.

The cyanic acid esters (mixtures of different cyanic
acid esters may of course also be used) may be polym-
erized with other monomeric polymerizable compounds
by mass polymerization, solution polymerization, suspen-
sion polymerization or by emulsion polymerization.

According to the invention, the cyanic acid esters should
be present in quantities of 0.5 to 20%, based on the
total amount of monomer used.

Suitable olefinic monomers which can be polymerized
with cyanic acid esters of the aforementioned type, include
in particular the following classes of compounds:

(a) Esters of α,β-unsaturated monocarboxylic acids, such as acrylic acid and methacrylic acid, with saturated aliphatic alcohols containing 1 to 20 carbon atoms or cycloaliphatic alcohols having 5–20 carbon atoms.

(b) α,β-Unsaturated carboxylic acids, such as acrylic acid or methacrylic acid by themselves.

(c) Amides of α,β-unsaturated carboxylic acids, such as acrylamide or methacrylamide.

(d) Nitriles of α,β-unsaturated carboxylic acids, such as acrylonitrile or methacrylonitrile.

(e) Aliphatic vinyl compounds, such as vinyl ethers, vinyl esters, vinyl ketones or vinyl halides, for example, vinyl ethyl ether, vinyl acetate or vinyl chloride.

(f) Conjugated diolefins containing 4 to 6 carbon atoms, such as butadiene, isoprene, 2,3-dimethyl butadiene or chloroprene.

(g) Aromatic vinyl compounds, for example, styrene or α-methyl styrene.

In addition, a large number of other olefinically unsaturated compounds may be readily copolymerised. In cases where a certain degree of pre-cross-linking is required in the latex, cross-linking monomers containing several olefinically unsaturated groups may be used in quantities from 0.01 to 10% by weight, based on the weight of the monomers as a whole. Examples are glycol diacrylates, glycol dimethacrylates, allyl acrylates or methacrylates, divinyl benzene, triallyl cyanurate, bis-(4-methacrylaminophenyl)-imino-carbonic ester, bis-(4-methacrylaminophenyl)-4'-methacrylhydroxyphenylimino carbonic ester or substitution products of these compounds.

Copolymers may be prepared both from two and from a larger number of monomers belonging to different classes of compounds, in which case the choice of the monomers will depend upon the properties required of the copolymers.

Of particular interest are copolymers which contain one or more hardening monomers (i.e., monomers whose incorporation in the copolymers increases their hardness) and at least one elasticising or softening monomer for example, conjugated diolefins, acrylic esters containing more than two carbon atoms in the ester group and methacrylic esters containing more than 4 carbon atoms in the ester group. Suitable hardening monomers are, for example, acrylonitrile, methacrylonitrile, vinyl chloride, vinylidene chloride, styrene, α-methyl styrene and methacrylic esters with alcohols containing less than four carbon atoms in the ester group.

The proportions in which the plasticising monomer components and the hardening monomer components are used will depend upon the properties required of the polymers or upon the purpose for which they are to be used.

In cases where soft, more or less elastic polymers are required which are intended to produce a soft handle when used, for example, as pigment binders or as coating and impregnating agents for textiles, the copolymer compositions chosen will mainly contain plasticising monomers such as butadiene, ethyl acrylate or butyl acrylate, in addition to the cyanic acid ester component. In cases such as these, hardening monomers such as styrene, acrylonitrile, vinyl chloride, methacrylates containing less than four carbon atoms in the ester alkyl, will only be used in much smaller quantities, if at all.

In the case of copolymers prepared by emulsion polymerization which are used in the form of aqueous dispersions or latices for producing films, as binders, as impregnating agents or surface-protection agents, the choice of the copolymer composition is governed by the required film-forming temperature, i.e., the temperature at which a cohesive film is formed from an aqueous dispersion or latex on evaporation of the water. In most cases, film-formation is preferably carried out at room temperature, i.e., at 20 to 25° C., so that the film-forming temperature must be below about 20° C. This property is also a feature of "soft" copolymers.

"Soft" copolymers in this sense comprise, for example:

(a) 0.5 to 20% by weight of cyanic acid esters corresponding to the formula

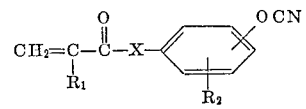

wherein $R_1$ represents H, $CH_3$ or Cl; $R_2$ represents H, alkyl ($C_1$–$C_4$) or Cl; and X represents O or NH;

(b) 99.5 to 40% by weight of monomers such as esters of acrylic acid with alcohols of 1 to 8 carbon atoms, butadiene or isoprene;

(c) 0 to 40% by weight of monomers such as styrene, α-methyl styrene, acrylonitrile, vinyl chloride or esters of methacrylic acid with alcohols of 1 to 4 carbon atoms, in which case the amount of component (b) is intended to make up at least 40% and preferably more than 50% of the total composition.

In other cases, where a polymer in the form of a solution which can be prepared by solution polymerisation, the choice of the composition is only governed by the required degree of hardness. In the case of polymers which are intended to be used, for example, in stoving lacquers for surface protection, maximum hardness is occasionally required. Polymers with a predominant amount of "hardening" monomer components such as styrene, α-methyl styrene, methacrylates containing 1 to 4 carbon atoms in the ester alkyl or vinyl chloride, are preferred. In order to reduce the brittleness of these copolymers, "plasticising" polymer components of the aforementioned type may be jointly used in much smaller quantities.

"Hard" copolymers in this sense comprise for example:

(a) 0.5 to 20% by weight of cyanic acid esters corresponding to the formula

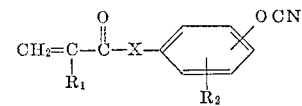

wherein $R_1$ represents H, $CH_3$ or Cl; $R_2$ represents H, alkyl ($C_1$–$C_4$) or Cl; and X represents O or NH;

(b) 0 to 40% by weight of monomers such as esters of acrylic acid with alcohols of 1 to 8 carbon atoms, butadiene or isoprene;

(c) 99.5 to 40% by weight of monomers such as styrene, α-methyl styrene, esters of methacrylic acid with alcohols of 1 to 4 carbon atoms or vinyl chloride, in which case the amount of component (c) is intended to make up at least 40% and preferably more than 50% of the total composition.

It is frequently advisable to modify the properties of the copolymers by incorporating in them small quantities of strongly polar monomers, for example, acrylic acid or methacrylic acid, acrylamide or methacrylamide. The quantities in which these monomers are used should not amount to more than 30%, preferably no more than 20%, based on the polymer as a whole.

In the case of mass polymerization, mixtures of the polymerizable cyanic acid esters and other suitable monomers are polymerised in known manner at temperatures in the range from 40 to 150° C. after the addition of radical formers for example, organic peroxide compounds, peroxycarbonates such as isopropyl peroxycarbonate or azo compounds such as azodiisobutyrodinitrile.

Copolymerization in solution may be carried out in any solvents in which the monomeric compounds and the copolymer are soluble and which do not react with the cyanic acid esters. Suitable solvents include, for example, methylethyl ketone, toluene, dimethylformamide and chloroform.

The copolymerization of the cyanic acid esters according to the invention with other monomers may also be carried out in aqueous suspension, in which case the monomer mixture is suspended in water containing a suspension stabiliser, for example, polymethyl vinyl ether, polyvinyl pyrrolidone, polyvinyl alcohol, methyl celluose or calcium phosphate, and is then polymerized in known manner after the addition of radical formers, for example, organic peroxides, peroxycarbonates or azo compounds.

Polymerization is preferably carried out in aqueous emulsion. Aqueous copolymer emulsions are obtained by copolymerizing the aforementioned monomers in known manner in an aqueous dispersion using emulsifiers. In this case, both cation-active and anion-active as well as non-ionic emulsifiers may be used. Combinations of these emulsifiers are also suitable.

Suitable anionic emulsifiers are, for example, higher fatty acids, resin acids, acidic fatty alcohol/sulphuric acid esters, higher alkyl sulphonates and alkyl-aryl sulphonates, sulphonated castor oil, sulphonic-succinic acid esters and the water-soluble salts of sulphonated ethylene oxide adducts.

Examples of cationic emulsifiers are the salts of quaternary ammonium compounds and pyridinium compounds.

Suitable non-ionic emulsifiers are the reaction products, known per se, of ethylene oxide with long-chain fatty alcohols or phenols. In this case, reaction products of more than 10 mols of ethylene oxide with 1 mol of fatty alcohol or phenol are preferably used.

The aforementioned emulsifiers are used in quantities from 0.5 to 20% by weight, based on the total amount of monomers. They are preferably used in quantities from 2 to 10% by weight.

According to a preferred embodiment of the invention, non-ionic emulsifiers, by themselves or mixtures thereof with up to 0.5% by weight of anionic and/or cationic emulsifiers, based on the polymer are used. If the polymer simultaneously contains —COOH, —CONH$_2$, —SO$_3$H or other hydrophilic groups, the latices are readily re-dispersible, i.e., the film prepared from the copolymer latex by drying at room temperature and at a pH-value of about 4 to 7, may be readily re-dispersed with water for a short time.

In order to prepare graft polymers, the polymerization or copolymerization of the monomers may be carried out as known per se in the presence of pre-formed polymers or copolymers, for example of conjugated diolefins such as butadiene, or in the presence of other already preformed polymers containing olefinic double bonds or other reactive groups.

Although polymerization is preferably carried out at temperatures in the range from 10 to 50° C., temperatures of up to 80° C. may also be used.

The pH value to be maintained during the preparation of the copolymers may vary within wide limits, preferably from pH 4 to 8, although it is advisable to maintain a pH value from 4 to 6 for the preparation of re-emulsifiable latices. Compounds which regulate the molecular weight, such as long-chain alkyl mercaptans, or diisopropyl xanthogenate, may be simultaneously used during polymerization.

Suitable polymerization catalysts include inorganic peroxy compounds such as potassium or ammonium persulphate, hydrogen peroxide, peroxycarbonates, organic peroxide compounds such as acyl peroxides, for example benzoyl peroxide, alkyl hydroperoxides such as tert.-butyl hydroperoxide, cumene hydroperoxide or p-menthane hydroperoxide, dialkyl peroxide such as di-tert.-butyl peroxide, and peroxy esters such as tert.-butyl perbenzoate. The inorganic or organic peroxy compounds are advantageously used in combination with reducing agents, as known per se. Suitable reducing agents are, for example, sodium pyrosulphite or bisulphite, sodium formaldehyde sulphoxylate, triethanolamine and tetraethylene pentamine.

The quantities in which the catalysts are used may vary within the limits normally used in polymerization reactions of this type, i.e., from 0.01 to 5% by weight, based on the total amount of monomer.

The polymers and copolymers obtained by the process according to the invention carry cyanic ester groups which react with one another at elevated temperatures and/or under the influence of alkaline agents, and at the same time cause the polymers to cross-link to form insoluble cross-linked products. By virtue of their ability to cross-link even under mild conditions to form insoluble products, the polymers and copolymers obtained in accordance with the invention may be used for the production of any type of coatings, as impregnating agents and as adhesives. For this purpose, the dispersions may be adjusted to an alkaline pH value, preferably from 8 to 11, with alkaline-reacting substances, preferably sodium hydroxide, potassium hydroxide, soda, potassium carbonate or potassium bicarbonate, applied to suitable substrates comprising, for example, textiles, fibre webs, glass, metal, leather or wood, after which the water is evaporated at room temperature or at elevated temperature to initiate cross-linking of the polymers.

The polymers may even be cross-linked merely by the influence of heat at pH values of about 7. For this purpose, temperatures in the range from 70 to 200° C., preferably from 110 to 160° C., have proved to be suitable.

After they have been cross-linked, the polymers according to the invention containing cyanic acid ester groups exhibit surprisingly good mechanical properties. Two identically prepared ethyl acrylate polymers, the first containing cyanic acid ester groups and the other containing methylol ether groups in equivalent molar proportions, were used for comparison (Example 2 and Comparison Example A).

Another surprising effect was the considerable adhesiveness of copolymers containing cyanic acid ester groups. The adhesiveness of a butyl acrylate copolymer containing, for example, 4% of 4-(methacrylaminophenyl)-cyanic acid ester, was considerably higher than that of a butyl acrylate homopolymer with the same K-value. The adhesiveness disappears when the copolymer is cross-linked. Such adhesiveness is often highly desirable in practice.

The parts given in the following examples are always parts by weight. The polymerizable monoolefinically unsaturated compounds are prepared by a method similar to that described in the example illustrating the preparation of 4-(methacrylamino-phenyl)-cyanate. A mixture of 200 parts of N-(4-hydroxyphenyl)-methacrylamide, 425 parts of acetone and 2 parts of copper powder was introduced into a 2-litre glass flask equipped with stirring mechanism and a dropping funnel and then cooled to 0° C. After addition of 76 parts of cyanogen chloride, 114 parts of triethylamine were slowly added dropwise with intensive stirring. The temperature should not exceed 10° C. during this addition. Stirring was then continued for 30 minutes, after which the mixture was suction-filtered and the filtrate was slowly stirred into 3,000 parts of ice water. The 4-(methacrylaminophenyl)-cyanate precipitated in crystalline form in a yield of 90%. The cyanate ester was filtered off, washed with water and dried in vacuo at room temperature. The dry cyanate ester had a melting point of 82° C. It melted at 87° C. after recrystallisation from petroleum ether.

The following compounds were prepared in the same way: 4-methacryloxyphenyl-cyanate

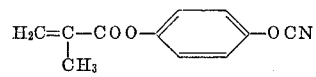

M.P. 59° C.; 4-acrylaminophenyl-cyanate, M.P. 149–150° C.; 2,6-dichloro-4-methacrylaminophenyl-cyanate, M.P. 79° C. (decomp.); 2-methyl-5-methacrylaminophenyl-cyanate, M.P. 93–94° C.; 2-methyl-4-methacrylaminophenyl-cyanate, M.P. 72–73° C.

EXAMPLE 1

A solution of 12 parts of a reaction product of oleyl alcohol with 15 mols of ethylene oxide and 1 part of the sodium salt of a naphthalene sulphonic acid/formaldehyde condensation product in 300 parts of water, was poured into a reaction vessel equipped with stirring mechanism, reflux condenser and thermometer from which the air was displaced with nitrogen. After the temperature had been increased to 40° C., 0.8 part of potassium persulphate and 1.2 parts of sodium pyrosulphite were added. A mixture of 192 parts of butyl acrylate and 8 parts of 4-(methacrylaminophenyl)-cyanate was then run in from a dropping funnel at such a rate that polymerization was completed at 40 to 45° C., the pH value of the emulsion being kept at pH 5 to 6, by the addition of dilute sodium hydroxide solution. A copolymer emulsion with a solids content of 38% by weight was obtained.

A film prepared from part of this copolymer emulsion by drying at room temperature on glass plates was readily soluble in dimethyl formamide or in methyl ethyl ketone. The infra-red spectrum of this copolymer showed the double band of the cyanate ester at 4.38 and at 4.46μ.

Another part of the copolymer emulsion was adjusted to pH 10 with dilute sodium hydroxide solution and dried on glass plates at room temperature. After 24 hours, the polymer film thus formed was completely insoluble in dimethyl formamide or in methyl ethyl ketone. It had a gel content of 91% in methyl ethyl ketone at 20° C.

Similar results were also obtained by replacing the 4-(methacrylaminophenyl)-cyanate with 4-(acrylaminophenyl)-cyanate and 4-(acryl or methacryloxyphenyl)-cyanate.

A comparison product prepared from butyl acrylate under the same conditions, but without the addition of a cyanic acid ester remained completely soluble in methyl ethyl ketone, even after similar treatment with an alkali.

EXAMPLE 2

A solution of 30 parts of a reaction product of 1 mol of p-nonyl phenol with 20 mols of ethylene oxide in 900 parts of water was introduced into a vessel equipped with stirring mechanism from which air was displaced with nitrogen. The solution was then heated to 40° C. After the addition of 2.4 parts of potassium persulphate and 3.6 parts of sodium pyrosulphite, a mixture of 576 parts of ethyl acrylate and 24 parts of the 4-(methacrylaminophenyl)-cyanate already used for Example 1 was run in from a dropping funnel at such a rate that polymerisation was completed at 40 to 45° C. The pH value was kept at 5 to 6 during polymerization. After stirring for two hours, the copolymer emulsion had a solids content of 37.5% by weight.

Part of this copolymer which contained free cyanate ester groups according to the infra-red spectra, was adjusted to pH 9 with sodium hydroxide and then dried in air on glass plates to form films. The strengths of the respective films are given in Table I.

The cross-linked copolymer had a gel content of 89.5% in methyl ethyl ketone at 20° C.

Similar results were also obtained with 4-(acrylaminophenyl)-cyanate as the cross-linking component.

Comparison Example A

As described in Example 2, a copolymer emulsion was prepared from 585 parts of ethyl acrylate and 15 parts of methacrylamide methylol methyl ether. (The amount of methyl ether used corresponds to the molar quantity of the cyanate ester used in Example 2.)

A sample of the copolymer emulsion was adjusted to pH 2 with normal sulphuric acid, and was dried in air on a glass plate to form a film.

This film was found to have the strength values listed in Table I.

Comparison of the strength values of an ethyl acrylate copolymer cross-linked with the aid of cyanate ester, with those of an ethyl acrylate copolymer cross-linked by methylol ether.

TABLE I

|  | Example 2 | Comparison Example A |
|---|---|---|
| Tensile strength according to DIN 53504 in kp./cm.$^2$ | 22.5 | 10.0 |
| Elongation according to DIN 53504 in percent | 300 | 850 |
| Load value at 20% elongation according to DIN 53504 in kp./cm.$^2$ | 1.7 | 1.0 |

EXAMPLE 3

A solution of 1 part of the sodium salt of a naphthalene sulphonic acid/formaldehyde condensation product and 22 parts of a reaction product of 1 mol of o-benzyl phenol with 15 to 20 mols of ethylene oxide, in 600 ml. of water, was introduced into a 3-litre glass vessel equipped with reflux condenser and stirring mechanism, from which the air was displaced by introducing nitrogen. The solution was then heated to 40° C. after which 1.6 parts of potassium persulphate and 2.4 parts of sodium pyrosulphite were added. A mixture of 296 parts of butyl acrylate, 20 parts of acrylonitrile, 10 parts of acrylic acid and 14 parts of 4-(methacrylaminophenyl)-cyanate was then run in from a dropping funnel at such a rate that the temperature did not exceed 50° C. during polymerisation.

Polymerization was complete after 1 to 2 hours' stirring. After they had been rubbed dry on the hand, a few drops of the copolymer emulsion thus prepared could be re-dispersed by stirring with water.

A film prepared by drying the latex adjusted to an alkaline pH value with sodium hydroxide at 70° C. had a gel content of 87% in methyl ethyl ketone at 20° C. Similar results were also obtained with 4-(methacryloxyphenyl)-cyanate.

EXAMPLE 4

96 parts of butyl acrylate and 10 parts of the cyanic acid ester used for Example 1, were dissolved in 250 parts of anhydrous toluene, and the resulting solution was mixed with 0.5 part of azoisobutyronitrile. Polymerization is carried out while stirring at 70° C. over a period of 24 hours. An extremely tacky polymer was obtained in a yield of about 98% which bonded considerably more firmly to a substrate than a butyl acrylate homopolymer with the same K-value prepared in the same way by polymerization in solution. The copolymer which was soluble in toluene, dimethyl formamide or methyl ethyl ketone, had a K-value of 39 (according to Fikentscher, Cellulosechemie 13, p. 58 (1932); measured in 0.5% by weight solution in dimethyl formamide at 20° C.).

It was possible by heating the copolymer at 120° C., to convert it into an insoluble, non-tacky cross-linked product.

Similar results were also obtained with 4-(acryl or methacryloxyphenyl)-cyanate as the cross-linking component.

EXAMPLE 5

A solution of 30 parts of 4-(methacrylaminophenyl)-cyanate in 270 parts of benzene was introduced into a 1-litre glass flask equipped with stirring mechanism, reflux condenser and thermometer, from which the air was displaced by introducing nitrogen. 0.9 part of azodiisobutyronitrile was then added, and polymerization was carried out at 70° C. After 24 hours, the homopolymer was isolated in a yield of 87% by filtration. After drying in vacuo at 40° C., the homopolymer of 4-(methacrylaminophenyl)-cyanate was in the form of a pale yellowish powder with a K-value of 23.

The homopolymer which contained free cyanic acid ester groups according to the infra-red spectra, was completely soluble in dimethyl formamide.

If the homopolymer was heated at 140° C. for 1 hour in nitrogen or in air, it became insoluble in dimethyl formamide.

We claim:
1. A homopolymer wherein the essential recurring unit is of the formula

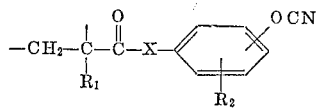

wherein $R_1$ is hydrogen, methyl or chloro; $R_2$ is hydrogen, alkyl of from 1 to 4 carbon atoms or chloro and X is O or NH.

2. A copolymer which is the ethylenic addition polymerization product of 0.5 to 20% by weight of a cyanic acid aryl ester of the formula

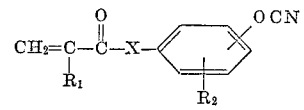

wherein $R_1$ is hydrogen, methyl or chloro; $R_2$ is hydrogen, alkyl of from 1 to 4 carbon atoms or chloro and X is O or NH and 99.5 to 80% by weight of a monomeric polymerizable compound selected from the group consisting of acrylic acid, methacrylic acid, esters of acrylic and methacrylic acids with saturated aliphatic alcohols having up to 20 carbon atoms and cycloaliphatic alcohols having 5-20 carbon atoms, acrylamide, methacrylamide, acrylonitrile and methacrylonitrile.

3. The process of cross-linking a homopolymer of claim 1 which comprises heating said homopolymer to a temperature of from 70–200° C.

4. The cross-linked homopolymer of claim 3.

5. The process of cross-linking a copolymer of claim 2 which comprises heating said copolymer to a temperature of from 70–200° C.

6. The cross-linked copolymer of claim 5.

7. The process of cross-linking a homopolymer of claim 1 which comprises contacting said polymer with an alkaline agent.

8. The cross-linked homopolymer of claim 7.

9. The process of cross-linking a copolymer of claim 2 which comprises contacting said copolymer with an alkaline agent.

10. The cross-linked copolymer of claim 9.

References Cited

UNITED STATES PATENTS 3,290,270   12/1966   Goldberg et al. _____ 260—47

WILLIAM H. SHORT, *Primary Examiner.*

M. GOLDSTEIN, *Assistant Examiner.*